United States Patent [19]

Gerster

[11] B 3,924,042

[45] Dec. 2, 1975

[54] METHOD FOR TREATMENT OF BACTERIAL PLANT DISEASE

[75] Inventor: John F. Gerster, Woodbury, Minn.

[73] Assignee: Minnesota Mining and Manufacturing Company, St. Paul, Minn.

[22] Filed: Mar. 26, 1973

[21] Appl. No.: 344,479

[44] Published under the Trial Voluntary Protest Program on January 28, 1975 as document no. B 344,479.

[52] U.S. Cl. ................................................ 424/258
[51] Int. Cl.² ...................... A01N 9/00; A01N 9/22
[58] Field of Search .................................. 424/258

[56] References Cited

UNITED STATES PATENTS 3,341,528    9/1967    Shavel et al. ................... 260/289 R

*Primary Examiner*—Albert T. Meyers
*Assistant Examiner*—D. W. Robinson
*Attorney, Agent, or Firm*—Alexander, Sell, Steldt & DeLaHunt

[57] ABSTRACT

A method for the treatment of plant disease caused by bacteria which comprises applying to infected plants an effective amount of 6,7-dihydro-9-fluoro-5-methyl-1-oxo-1H,5H-benzo[ij]-quinolizine-2-carboxylic acid or a salt thereof.

2 Claims, No Drawings

METHOD FOR TREATMENT OF BACTERIAL PLANT DISEASE

BACKGROUND OF THE INVENTION

Compounds useful in the method of the present invention and their preparation are described in U.S. Pat. application Ser. No. 303,254, filed Nov. 12, 1972. These compounds are 6,7-dihydro-9-fluoro-5-methyl-1-oxo-1H,5H-benzo-[ij]quinolizine-2-carboxylic acid and certain salts thereof.

Although many compounds are known to be effective antibacterial agents in vitro and, to a lesser extent in vivo, only very few of these agents are useful to cure plant disease. Antibiotics such as streptomycin have also been used to treat plant infections caused by bacteria. It was surprising and unexpected to find that the substituted benzo[ij]quinolizine-2-carboxylic acid and salts of the invention are effective in controlling plant diseases.

DETAILED DESCRIPTION OF THE INVENTION

This invention relates to the treatment of plant disease by applying an effective amount of a compound of Formula I to cure an infected plant, or to a healthy plant to prevent development of infection.

The compounds in the method of the invention have the formula

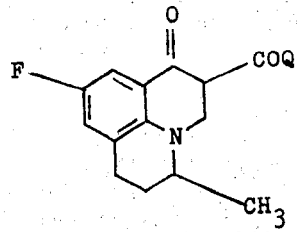

wherein Q is hydroxy or OM, where M is a horticulturally acceptable cation. These cations are metallic, amine or ammonium ions. Most preferred are the horticulturally acceptable salts. Such salts are the sodium, potassium, amine (e.g. ethanolamine and diethanolamine) and ammonium salts.

The compounds of the invention are evaluated in vitro using standard test procedures which include a variation of the well-known agar-plate diffusion assay method of Vincent and Vincent.

Leading references to the method are: Vincent et al., Proc. Soc. Exptl. Biol. Med. 55:162–164 (1944), and Davis et al., Jour. Bact. 66:129–136 (1953).

The other test procedure used in the well-known serial tube dilution technique of Grove and Randall.

The compounds of the invention generally show activity in one or both of these assays. These assays are used to show broad spectrum activity against gram-negative bacteria and, importantly, against a major plant disease known as fire blight in apple and pear trees. The disease is caused by the bacterium designated *Erwinia amylovora*.

The compounds of the invention show in vivo activity in plants against Erwinia. They are safe (i.e. without significant toxicity) for application to apple and pear trees at antibacterially effective rates.

In vivo evaluation of compounds of the invention versus fire blight is carried out in the greenhouse as follows:

Compounds to be evaluated are applied to Bartlett pear seedlings one to three months of age in a foliar or systemic application. Solutions or suspensions are applied to the foliage by dipping the plant into the liquid or by spraying to runoff. Inoculation of foliage with test bacteria is carried out immediately after drying.

Systemic application consists of a soil drench; inoculation takes place two days thereafter.

In the screen, the foliar rate is 300 ppm of active material applied to the plant. The systemic rate is 30 mg. active ingredient/plant in 4 inch plastic pots containing 480 grams of soil. Seedlings are inoculated with suspension of *Erwinia amylovora* of 1,000 cells per 0.5 cc. in nutrient-yeast-glucose broth. The solution is placed in a hypodermic syringe (needle 26 g. one-half) and injected into the tissue half way between the terminal and the first lateral node.

After inoculation the plants are placed in a growth changer (100 percent relative humidity, 21°–24° C.) for 5 days. In untreated controls, by the second day there should be an indication of blighting, and within 3 days the seedlings will exhibit typical symptoms of fire blight. The seedlings are placed in the greenhouse for 2 weeks longer prior to evaluation.

Further evaluation of compound I has been carried out in the field under representative growing conditions.

Materials and Methods

Apple trees used at this test plot were Paulared, McIntosh and Viking; all were three years old. In 1971 extensive blighting of these trees took place. They were cut back to non-infected tissue. This left the Paulared 1 foot high, the McIntosh 3 feet high and Viking 3½ feet high.

The test plot was designed so that each variety had five replications with the exception of the Viking where only three trees were available. Each replication consisted of one tree used for compound I, one for streptomycin and one for a check. Compound I as the acid, 25 percent wettable powder (75 percent inert material) and streptomycin (commercial formulation) were applied at 600 ppm; both compounds were sprayed to runoff. Compound I was applied 9 times at weekly intervals, whereas streptomycin was applied 6 times (weekly intervals). Streptomycin was stopped at six applications because of the chlorotic condition of the plants. There was no indication of toxicity with compound I.

Natural infection of *Erwinia amylovora* was sufficient in the orchard. Artificial infection of the trees was not necessary for a valid test.

Environmental Conditions

The prevailing weather conditions at this test site were ideal for the development and spread of fire blight throughout the orchard. The rainfall averaged between ¾ and 1¼ inches per week, with a relative humidity of about 80 to 90. Temperatures during the day were in the middle 70's to high 80's (° F.) with a constant moderate wind which aided in the dispersal of the bacteria.

Over-wintering cankers were a major factor in the extensive blight throughout the orchard for they are already a source of inoculum in the early spring. In conjunction with this, mechanical damage aids in the rapid spread of *Erwinia amylovora*. In this orchard there were two types of mechanical damage, machinery and deer grazing. Both types will produce a point of entry for the bacteria.

Under these conditions, fire blight spread throughout the main part of the orchard destroying 25–50 percent of the new growth. In some cases the complete tree was destroyed. In the test plot the fire blight was restricted to the untreated controls, two trees sprayed with streptomycin and one tree sprayed with compound I.

Results

Paulared:

Two control trees contracted fire blight on July 18, 1972, and by July 25, 1972 both trees were completely infected. Trees sprayed with compound I and streptomycin at 600 ppm did not exhibit fire blight. Streptomycin-sprayed trees exhibited chlorosis of the leaves on June 27, 1972. On July 25, 1972 spraying of streptomycin was stopped. The chlorotic conditions of the leaves became too severe to continue the streptomycin spray. Compound I was not phytotoxic to this variety.

McIntosh:

In this section of the test fire blight was restricted to two control trees, two streptomycin-sprayed trees and one tree sprayed with compound I. The two trees sprayed with streptomycin exhibited fire blight on June 6, 1972 on the lower scaffolding of the trees. The blight was eliminated from the trees by an accidental application of paraquat on the branches. Paraquat destroyed only the green foliage; the second set of leaves that developed were blight-free. In comparing the amount of fire blight moving down the terminal shoots between the infected controls and the infected trees sprayed with compound I, compound I retarded the movement of the blight and kept it from moving into the old wood, whereas in the controls and the trees sprayed with streptomycin at 100 ppm (in the main part of the orchard) the movement was not retarded, and the blight was not stopped in the new wood or the old wood.

Viking:

Three controls contracted fire blight on July 18, 1972, while the trees sprayed with compound I and streptomycin did not show symptoms of fire blight.

From the tests it was seen that there was no phytotoxicity with compound I at 600 ppm in field testing. Compound I controlled fire blight in the field tests. In the case where control was not effected, compound I retarded the movement of the blight and held it in the new wood, indicating systemic action of the compound.

Compound I was field tested on Bartlett pears, and it was found that the compound gave complete control of fire blight. *Erwinia amylovora* was inoculated directly into the trees to insure that there would be an infection. Compound I at 600 ppm gave complete control, whereas streptomycin at 100 ppm exhibited three terminal infections per tree; and all control trees were infected.

The compounds active in the process of the invention are expected to show broad activity versus plant diseases, particularly diseases caused by gram-negative bacteria.

Compound I has been found to possess activity versus *Xanthomonas pruni* by in vitro testing. Compound I has also been found to control blight to soybeans by in vivo testing. The microorganism causing blight of soybeans, *Pseudomonas glycinea*, is 100 percent controlled when compound I is applied at a rate of 300 ppm.

The compounds used in the process of the invention are formulated into dusts, solutions or suspensions or used as finely divided solids without formulation. It is presently preferred to use them formulated as wettable powders containing, for example, 25 percent active compound, 72 percent carrying agent (for example kaoline), 1.5 percent surfactant and 1.5 percent dispersing agent.

Alternatively, the formulations may be solutions. For example, the sodium salt of compound I is diluted with water to provide a solution of four pounds per gallon. This is applied to infected trees by spraying.

The potassium hydrate and diethanolamine salts have also been prepared and can also be used in such formulations.

What is claimed is:

1. A method for controlling plant disease caused by *Erwinia amylovora*, *Xanthomonas pruni* or *Pseudomonas glycinea* which comprises contacting the foliage of a plant or drenching the soil surrounding a plant with at least an effective, non-phytotoxic controlling amount of a carboxylic acid of the formula

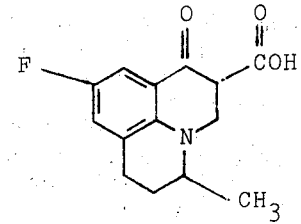

or horticulturally acceptable metal, amine or ammonium salt thereof.

2. The method of claim 1 wherein the salt is the sodium salt.

* * * * *